(12) United States Patent
Lionetti et al.

(10) Patent No.: US 8,473,698 B2
(45) Date of Patent: *Jun. 25, 2013

(54) CONVERTING LUNS INTO FILES OR FILES INTO LUNS IN REAL

(75) Inventors: Chris Lionetti, Duvall, WA (US); Robert Pike, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/298,835

(22) Filed: Nov. 17, 2011

(65) Prior Publication Data

US 2012/0066452 A1   Mar. 15, 2012

Related U.S. Application Data

(63) Continuation of application No. 12/464,329, filed on May 12, 2009, now Pat. No. 8,074,038.

(51) Int. Cl.
*G06F 12/00* (2006.01)

(52) U.S. Cl.
USPC ............ 711/162; 711/173; 711/202; 711/203

(58) Field of Classification Search
USPC ................. 711/162, 173, 202–203, 206–208; 713/165–167
See application file for complete search history.

(56) References Cited

U.S. PATENT DOCUMENTS

| | | | |
|---|---|---|---|
| 7,107,385 B2 | 9/2006 | Rajan et al. | |
| 7,409,495 B1 | 8/2008 | Kekre et al. | |
| 7,460,672 B2 * | 12/2008 | Klein | 380/278 |
| 7,937,545 B1 | 5/2011 | Wu et al. | |
| 8,074,038 B2 * | 12/2011 | Lionetti et al. | 711/162 |
| 8,095,753 B1 * | 1/2012 | Pandey et al. | 711/162 |
| 2005/0235132 A1 | 10/2005 | Karr et al. | |
| 2008/0189468 A1 | 8/2008 | Schmidt et al. | |
| 2008/0270564 A1 | 10/2008 | Rangegowda et al. | |

FOREIGN PATENT DOCUMENTS

| | | |
|---|---|---|
| CN | 1821979 A | 8/2006 |
| CN | 101046726 A | 10/2007 |
| CN | 101669106 A | 3/2010 |

OTHER PUBLICATIONS

"VMware ESX Server: Using Raw Device Mapping", Retrieved at <<http://www.vmware.com/pdf/esx25_rawdevicemapping.pdf, vmware, pp. 1-16.
"Storage Considerations", Retrieved at <<http://technet.microsoft.com/en-us/library/bb963723.aspx>>, 2009, pp. 2.
"Configuring a SAN Environment for VMM 2008", Retrieved at <<http://technet.microsoft.com/en-us/library/cc764269. aspx>>, Oct. 21, 2008, pp. 4.

* cited by examiner

*Primary Examiner* — David Lam

(57) ABSTRACT

A LUN is provided that can store multiple datasets (e.g., data and/or applications, such as virtual machines stored as virtual hard drives). The LUN is partitioned into multiple partitions. One or more datasets may be stored in each partition. As a result, multiple datasets can be accessed through a single LUN, rather than through a number of LUNs proportional to the number of datasets. Furthermore, the datasets stored in the LUN may be pivoted. A second LUN may be generated that is dedicated to storing a dataset of the multiple datasets stored in the first LUN. The dataset is copied to the second LUN, and the second LUN is exposed to a host computer to enable the host computer to interact with the dataset. Still further, the dataset may be pivoted from the second LUN back to a partition of the first LUN.

20 Claims, 13 Drawing Sheets

1502 pivot access to the dataset from the second host computer to the first host computer by mapping the LUN that contains the dataset to a LUN partition

1602 expose a first LUN of a storage array to a first host computer and a second LUN of the storage array to a second host computer

1604 receive a request from the second host computer to retire the second LUN

1606 determine a size of the partition in the second LUN

1608 store a copy of the dataset in the first LUN

1610 update a partition table of the first LUN to include a partition corresponding to a storage region of the first LUN that stores the copy of the dataset

FIG. 16

CONVERTING LUNS INTO FILES OR FILES INTO LUNS IN REAL

This application is a continuation of allowed U.S. application Ser. No. 12/464,329, filed on May 12, 2009, which is incorporated by reference herein in its entirety.

BACKGROUND

Computer data storage refers to components, devices, and/or recording media used to retain digital data for periods of time. Various types of physical storage devices exist, including memory devices (e.g., semiconductor storage), such as random access memory (RAM) devices and read only memory (ROM) devices, and mass storage devices, such as optical discs and magnetic storage (hard disks, magnetic tapes, etc.), and further types of storage. Such, storage devices may be pooled in various ways to provide higher levels of storage, and higher levels of storage reliability. For example, numbers of storage devices may be combined to form RAID (redundant array of independent disks) arrays, storage area networks (SANs), and other collections of storage.

Storage virtualization is a way of abstracting virtual or logical storage from physical storage. A storage system configured to provide virtual storage may present computers with logical storage locations that the computers may access. The storage system is configured to map the logical storage locations to physical storage locations in physical storage. In one type of virtual storage, a logical storage device may be referred to as a LUN (logical unit number). A computer may have one or more LUNs exposed to it by the storage system that the computer may access. Blocks of data may be addressed in a LUN by offsets or locations within that LUN, which may be referred to as logical block addresses (LBAs).

Various types of data may be stored in virtual storage, including virtual machines. A virtual machine is a software implementation of a physical computer that executes programs similarly to a physical computer. A "system virtual machine" may provide a complete computer platform, including an operating system. Such a system virtual machine may execute one or more programs. A "process virtual machine" is designed to run a single program. The one or more files representative of a virtual machine may be referred to as a virtual hard drive.

Currently, a virtual image corresponding to a virtual machine is typically deployed in an isolated LUN of a virtual storage system. The storage system exposes the LUN to a host computer to enable the host computer to execute the virtual machine. When large numbers of virtual machines (e.g., hundreds, thousands, or more virtual machines) are implemented by a host computer, the host computer expends a large amount of resources to manage and index the virtual machines. For example, one current computer file system is not capable of supporting more than 255 allocated LUNs. Furthermore, a performance of the computer file system may become poor after being allocated 50 LUNs. Thus, managing large numbers of virtual machines is not realistically possible with virtual machines implemented in LUNs according to conventional techniques.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided for storing multiple datasets in a logical unit number (LUN) to enable improved performance. A LUN is provided that can store multiple datasets (e.g., virtual machines stored as virtual hard drives). The LUN may be partitioned into multiple partitions. One or more datasets may be stored in each partition. As a result, multiple datasets can be accessed through a single LUN, rather than through a number of LUNs that is proportional to the number of datasets.

Furthermore, the datasets stored in the LUN may be pivoted. In one implementation, a system and method in a storage array controller is provided. A first LUN is exposed from a storage array to a first host computer. A pivot request is received from the first host computer regarding a partition of a plurality of partitions of the first LUN (the partition may be any of the plurality of partitions). The partition stores a dataset of a plurality of datasets stored in the plurality of partitions. A size of the partition in the first LUN is determined A partition table is generated that indicates a location and a size for a second partition. A second LUN of the storage array is generated to have a size configured to accommodate a signature for the second LUN, the partition table, and the second partition. The signature and the partition table are stored in the second LUN. The partition of the first LUN is copied from the first LUN to the second LUN at the location indicated in the partition table for the second partition. The second LUN is mapped to a second host computer.

Subsequently, a request may be received from the second host computer to retire the second LUN. A size of the second partition is determined A copy of the second partition is stored in the first LUN. A partition table of the first LUN is updated to indicate a partition corresponding to a storage region of the first LUN in which the copy of the second partition is stored.

If the size of the second partition does not exceed a size of the originally pivoted partition in the first LUN, the copy of the second partition may be stored in that partition of the first LUN. If the size of the second partition exceeds the size of the originally pivoted partition in the first LUN, a size of the first LUN may be grown by appending a storage region to the first LUN, and the copy of the second partition may be stored in the appended storage region of the first LUN.

In another implementation, a system and method in a first host computer is provided. An indication is received of a first logical unit number (LUN) exposed by a storage array to the first host computer. A signature and a partition table are stored in the first LUN. The first LUN is partitioned into a plurality of partitions. A plurality of datasets is stored in the plurality of partitions. Access to a partition of the plurality of partitions is closed that stores a dataset of the plurality of datasets. A pivot request is transmitted to the storage array regarding the closed partition. The storage array is configured to copy the partition to a second LUN and to map the second LUN to a second host computer in response to the pivot request.

Computer systems and computer program products (stored on a computer readable medium) are also described herein that are capable of performing and/or enabling the methods described above and elsewhere herein, and for implementing further embodiments as described herein.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 15 shows a process for pivoting access to a dataset from the second host computer to the first host computer, according to an example embodiment.

FIG. 16 shows a flowchart providing a process for pivoting a dataset from the second host computer to the first host computer, according to an example embodiment.

Figure 1:
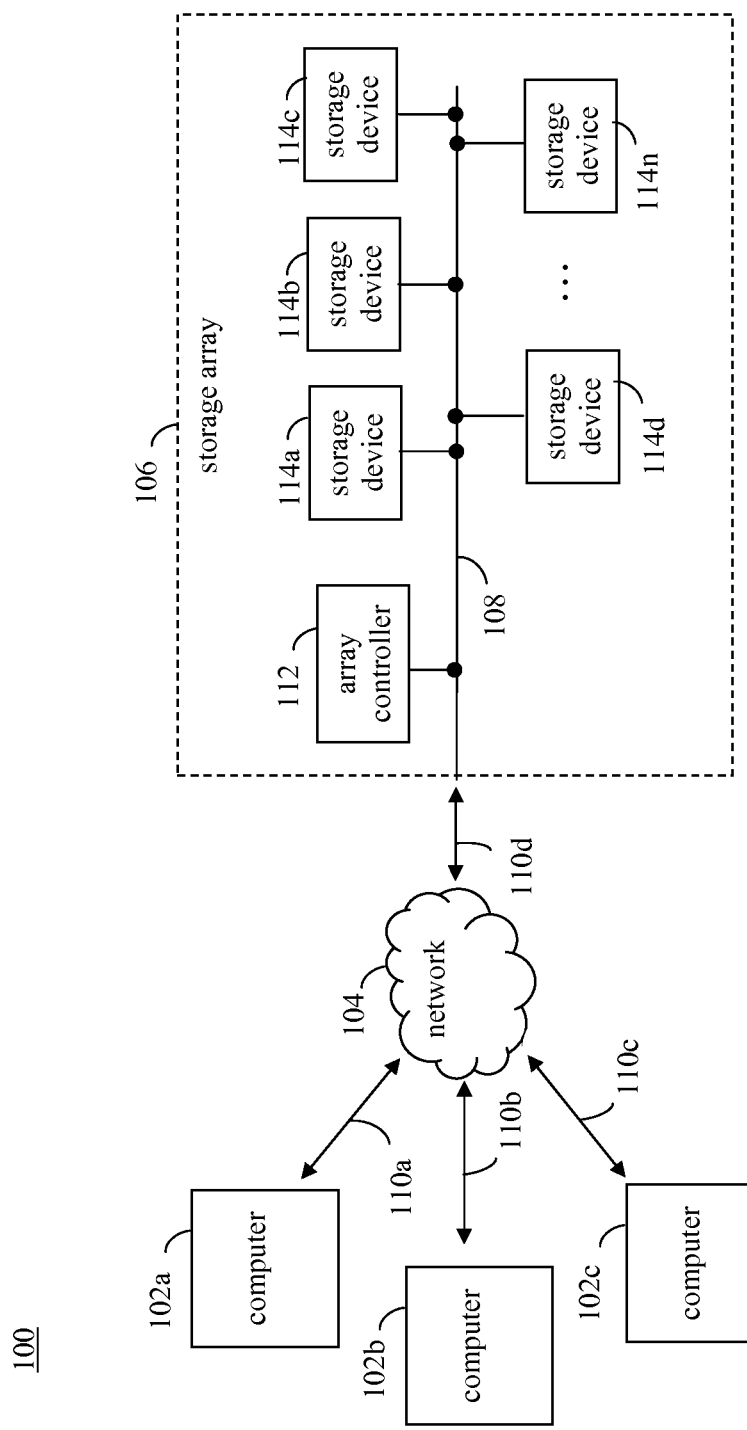
FIG. 1 shows a computing and data storage system in which a plurality of computing devices access shared storage.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

II. Storage System Embodiments

Embodiments of the present invention relate to techniques for storing data and accessing data stored in computer data storage. For example, FIG. 1 shows a computing and data storage system 100 in which a plurality of computing devices access shared storage. As shown in FIG. 1, system 100 includes first-third host computers 102a-102c, a communication network 104, and a storage array 106. Storage array 106 includes a plurality of storage units/storage devices 114a-114n and a storage communication network 108. In the example of FIG. 1, first-third host computers 102a-102c share access to storage array 106, including being enabled to store data in, and to retrieve data stored in storage devices 114a-114n of storage array 106.

Although three host computers 102a-102c are shown in FIG. 1, any number of host computers 102 may be coupled to network 100 to share storage array 106, include hundreds, thousands, or even further numbers of computing devices. Examples of host computers 102 include stationary and mobile computing devices. For example, each of host computers 102a-102c may be a server, a desktop computer (e.g., a personal computer), a mobile computer (e.g., a personal digital assistant (PDA), a laptop computer, a notebook computer, a smart phone, etc.), or other type of computing device.

Each of host computers 102a-102c is shown in FIG. 1 as communicating with storage array 106 through network 104 and a corresponding communication link. For example, as shown in FIG. 1, host computer 102a is communicatively coupled with network 104 through a first communication link 110a, host computer 102b is communicatively coupled with network 104 through a second communication link 110b, and host computer 102c is communicatively coupled with network 104 through a third communication link 110c. Storage array 106 is shown communicatively coupled with network 104 through a fourth communication link 110d. Network 104 may be a LAN, WAN (wide area network), or combination of networks, such as the Internet. First-fourth communication links 110a-110d may include any type or combination of communication links, including wired and/or wireless links, such as IEEE 802.11 wireless LAN (WLAN) wireless links, Worldwide Interoperability for Microwave Access (Wi-MAX) links, cellular network links, wireless personal area network (PAN) links (e.g., Bluetooth™ links), Ethernet links, USB links, etc.

Although storage devices 114a-114n are shown in FIG. 1, any number of storage devices 114 may be included in storage array 106 to store data, including hundreds, thousands, or even further numbers of storage devices. Array controller 112 and storage devices 114a-114n are shown in FIG. 1 as communicatively coupled together by storage communication network 108. Storage devices 114a-114n and storage communication network 108 may be arranged or associated in storage array 106 in any configuration, including in a storage area network (SAN), a Fibre Channel array, network attached storage (NAS), etc. A storage device 114 may be any type of storage device, volatile and/or non-volatile, including a memory device and/or a mass storage device. Examples of storage devices 114 include memory devices (e.g., semiconductor storage), such as random access memory (RAM) devices (volatile or non-volatile), and read only memory (ROM) devices, and mass storage devices, such as optical discs and magnetic storage (hard disks, magnetic tapes, etc.), and further types of storage.

Storage virtualization is a way of abstracting logical storage from physical storage. A storage system configured to provide virtual storage may present computers with logical storage locations that the computers may access. The storage system is configured to map the logical storage locations to physical storage locations in physical storage.

For example, as shown in FIG. 1, storage array 106 may include an array controller 112. Array controller 112 may be configured to allocate logical storage to host computers 102a-102c based on the physical storage of storage devices 114a-114n. For example, array controller 112 may be configured to combine the set of physical storage devices of storage array 106 to create a RAID (redundant array of independent disks) array or set. A RAID set is a logical construct of storage devices 114a-114n. Storage array 106 may be configured in various types of RAID sets for storage array 106. One example of a RAID set is a "RAID 1," where storage devices 114a-114n include mirror imaging storage devices. Further types of RAID sets may alternatively be included in storage array 106, including RAID 0, RAID 5, RAID 6, and RAID 10 configurations, which are well known to persons skilled in the relevant art(s). Array controller 112 may use some portion of usable storage space from the RAID set to generate a virtual representation of a hard drive called a LUN (logical unit number). Each of computers 102a-102c may have one or more LUNs exposed to it by array controller 112 for storage access.

Figure 2:
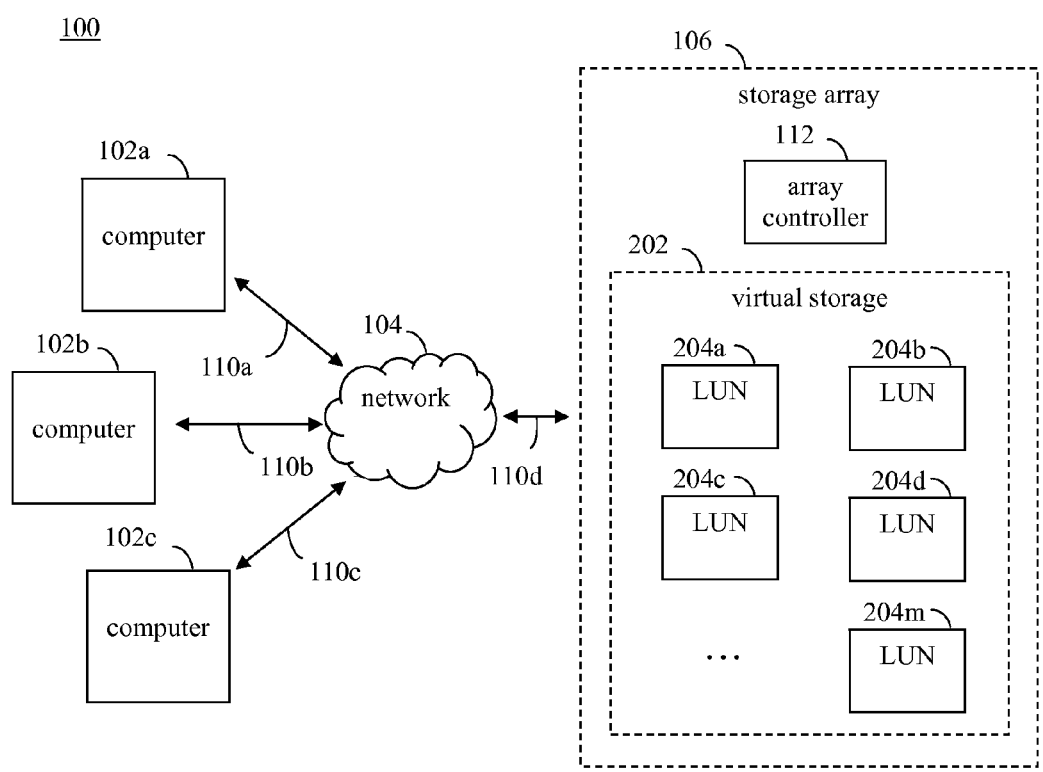
FIG. 2 shows a block diagram of the computing and data storage system of FIG. 1, where a storage array is presented to host computers in the form of virtual storage.
Figure 3:
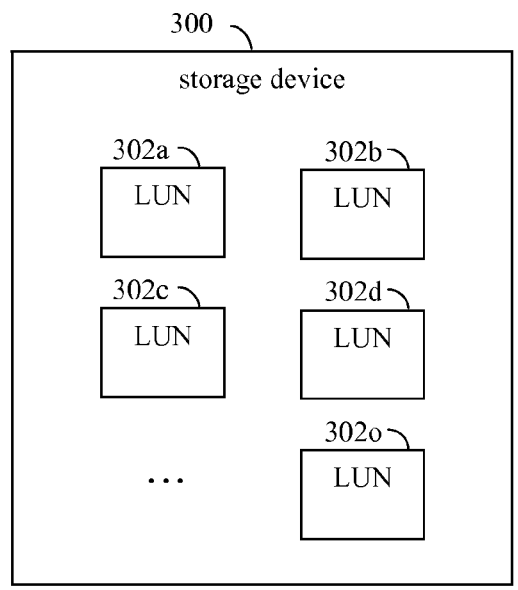
FIG. 3 shows a block diagram of a storage device that provides virtual storage in the form of logical unit numbers (LUNs).

For example, FIG. 2 shows a block diagram of computing and data storage system 100 of FIG. 1, where storage array 106 is presented to host computers 102a-102c by array controller 106 in the form of virtual storage 202. As shown in FIG. 2, virtual storage 202 includes a plurality of LUNs 204a-204m. LUNs 204a-204m are each generated by array controller 112 as a portion of the storage of storage devices 114a-114n (shown in FIG. 1) that may be presented to one of computers 102a-102c as virtual storage. For example, FIG. 3 shows a block diagram of a storage device 300, which is an example of one of storage devices 114a-114n shown in FIG. 1. As shown in FIG. 3, storage device 300 is logically divided into a plurality of LUNs 302a-302o. Each LUN 302 may be any portion of storage device 300, including an entire hard disk, a portion of a hard disk (e.g., a range of blocks) a spindle, a memory region of a memory device, etc. Each LUN 302 may be exposed to a host computer. An operating system of the host computer interacts with a LUN 302 as if it is physical storage.

Referring back to FIG. 2, although LUNs 204a-204m are shown, any number of LUNs 204 may be included in storage array 106, including hundreds, thousands, or even further numbers of LUNs 204. Furthermore, any number of LUNs 204 may be presented to each of computers 102a-102c. Each LUN 204 includes a plurality of addressable data blocks. Particular data blocks in LUNs 204a-204 may be addressed by a computer 102 by identifying a particular LUN, and by providing an offset or location within the particular LUN in the form of one or more logical block addresses (LBAs).

Various types of data and/or applications may be stored in virtual storage 202. Such data and applications are referred to herein as "datasets." One example of a dataset is a virtual machine. A virtual machine is a software implementation of a physical computer that executes programs similarly to a physical computer. A "system virtual machine" may provide a complete computer platform, including an operating system. Such a system virtual machine may execute one or more programs. A "process virtual machine" is designed to run a single program. Examples of virtual machines include SQL servers, web servers, etc. The one or more files representative of a virtual machine may be referred to as a "virtual image."

Currently, a virtual image corresponding to a virtual machine is deployed in an isolated LUN (e.g., one of LUNs 204 shown in FIG. 2) of a virtual storage system. In such a virtual storage system, the LUN is exposed to a host computer to enable the host computer to execute the virtual machine. When large numbers of virtual machines (e.g., hundreds, thousands, or more virtual machines) are implemented by a host computer, an equal number of LUNs is exposed to the host computer containing the virtual machine images.

Figure 4:
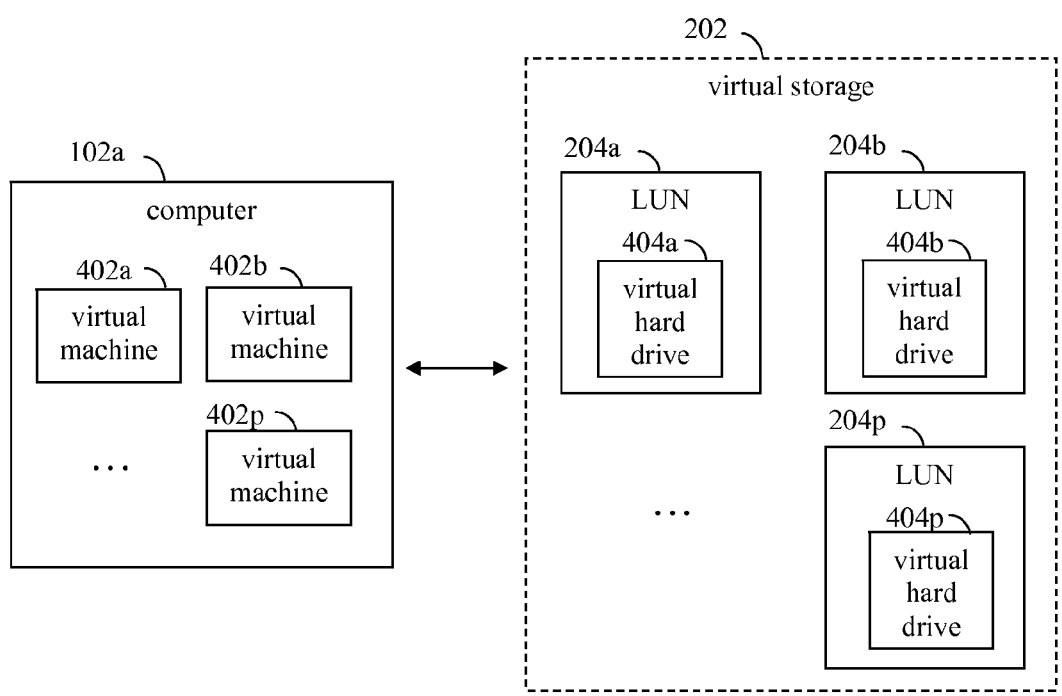
FIG. 4 shows a block diagram of a host computer executing a plurality of virtual machines.

For example, FIG. 4 shows a block diagram of a host computer 102a executing a plurality of virtual machines 402a-402p. Furthermore, FIG. 4 shows virtual storage 202 including a plurality of LUNS 204a-204p allocated to computer 102a as storage for virtual machines 402a-402p. As shown in FIG. 4, each of LUNs 204a-204p includes a corresponding one of virtual hard drives 404a-404p. Virtual hard drives 404a-404p are virtual storage locations for data corresponding to virtual machines 402a-402p. For example, virtual hard drives 404a-404p may each store one or more files that are executed by computer 102a as a corresponding one of virtual machines 402a-402p. Furthermore, virtual hard drives 404a-404p each may provide virtual storage for the corresponding one of virtual machines 402a-402p.

Virtual machines access storage through several levels of abstraction, from virtual storage to physical storage. Some virtual machines may also be referred to as "virtual servers." During operation, virtual machine 402a may attempt to write a block of data to its virtual hard drive 404a. An operating system (OS) of computer 102a may intercept the data block write operation, and may perform a conversion to determine where the block of data should be written with respect to LUN 204a. For example, virtual machine 402a may attempt to write a data block having a LBA of 394 to virtual hard drive 404a. The OS may determine that data block offset 394 in virtual hard drive 404a is equivalent to a LBA of 9942 in LUN 204a. Thus, the OS may attempt to write the data block to LBA 9942 of LUN 204a. Array controller 112 (in FIG. 1) may receive the write request for LBA 9942 from the OS of host computer 102a, and may write the data block to the actual physical location in storage array 106 corresponding to LBA 9924 (e.g., real spindle block 12345 on both spindle 47 and spindle 48 of storage device 114a).

Host computer 102a expends a large amount of resources to manage and index LUNs 204a-204p and virtual machines 402a-402p, which may number in the hundreds, thousands, or even greater numbers. Host computer 102a, which treats LUNs 204a-204p as if they are physical storage, monitors LUNs 204a-204p to ensure that they are operating properly, essentially managing LUNs 204a-204p. Furthermore, many paths to each storage device in storage array 106 may exist, and host computer 102 may attempt to manage each path as well. This results in a large amount of overhead for host computer 102a to maintain. It is common for a server with a single attached LUN to manage 8 related devices. If a large number of LUNs (and the corresponding multiple paths) are exposed to a server, the server may take a large amount of time to discover the set of paths and storage devices. With a high enough number of exposed LUNs, the server may become unresponsive and/or may crash. Thus, managing very large numbers of virtual machines is not realistically possible with virtual machines implemented in isolated LUNs.

In an embodiment, a LUN is provided that can store multiple datasets, including multiple virtual machines (stored as virtual hard drives). The LUN may be partitioned into multiple partitions. One or more datasets may be stored in each partition. As a result, a host computer that needs access to multiple datasets can access the multiple datasets through a single LUN, rather than through a number of LUNs proportional to the number of datasets. In this manner, the amount of hardware (e.g., LUNs, viewed by the host computer as hardware) that is tracked by the host computer is reduced.

Figure 5:
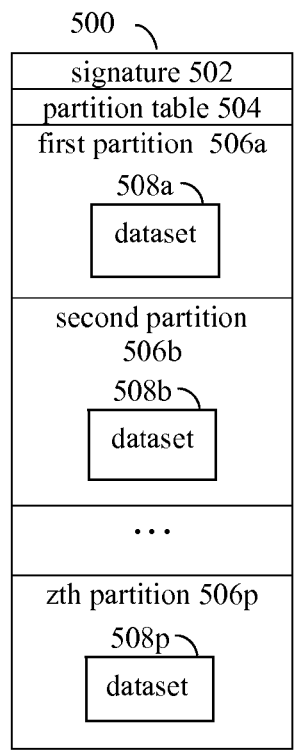
FIG. 5 shows a block diagram of a LUN having multiple partitions, according to an example embodiment.

For instance, FIG. 5 shows a block diagram of a LUN 500, according to an example embodiment. As shown in FIG. 5, LUN 500 includes a plurality of partitions 506a-506p. Furthermore, each partition 506 stores a corresponding one of datasets 508a-508p. Alternatively, more than one dataset 508 may be stored in each partition 506. By enabling multiple datasets to be stored in a LUN, a lower number of LUNs can be allocated to a host computer to enable the host computer to access a same or greater number of datasets (e.g., by a factor of a number of partitions per LUN).

Figure 6:
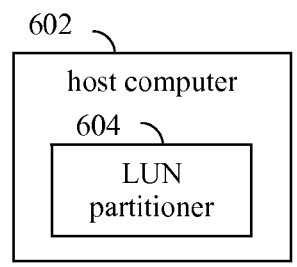
FIG. 6 shows a block diagram of a host computer, according to an example embodiment.

In embodiments, an array controller or a host computer may partition a LUN as shown in FIG. 5. For example, FIG. 6 shows a block diagram of a host computer 602, according to an example embodiment. Host computer 602 is an example of one of computers 102a-102c. As shown in FIG. 6, host computer 602 includes a LUN partitioner 604. LUN partitioner 604 is configured to enable host computer 602 to partition a LUN, such as LUN 500 of FIG. 5, into multiple partitions 506.

Figure 7:
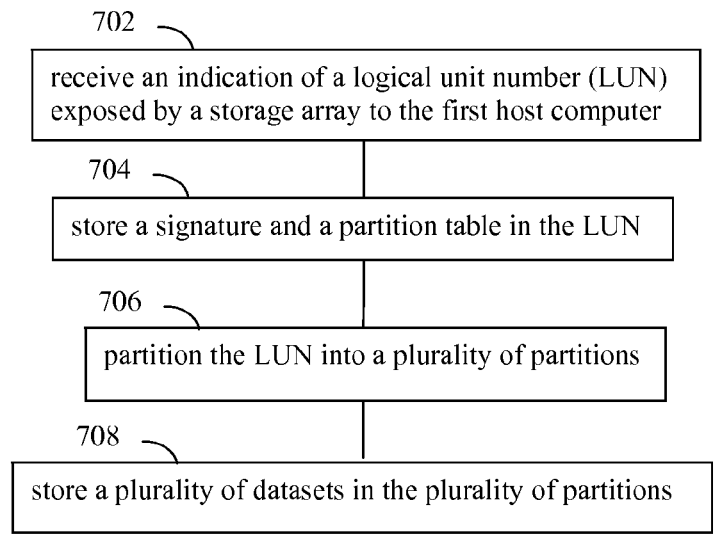
FIG. 7 shows a flowchart providing a process for partitioning a LUN, according to an example embodiment.

LUN partitioner 604 may be configured to partition a LUN in various ways. For instance, FIG. 7 shows a flowchart 700 providing a process for partitioning a LUN, according to an example embodiment. In an embodiment, flowchart 700 may be performed by host computer 602 shown in FIG. 6. Other structural and operational embodiments will be apparent to persons skilled in the relevant art(s) based on the discussion regarding flowchart 700. Flowchart 700 is described as follows.

As shown in FIG. 7, flowchart 700 begins with step 702. In step 702, an indication is received of a logical unit number (LUN) exposed by a storage array to the first host computer. For example, in an embodiment, host computer 602 may receive an indication from an array controller, such as array controller 112 shown in FIG. 2, of a LUN exposed to host computer 602, such as LUN 500 shown in FIG. 5. LUN 500 is exposed to host computer 602 so that host computer 602 may access LUN 500 as virtual storage. LUN 500 may be indicated to host computer 602 by a LUN identifier (e.g., an identification number) and an amount of storage provided by LUN 500. For example, a range of logical block addresses (LBAs) may be provided to host computer 602 to indicate an amount of storage of LUN 500.

In step 704, a signature and a partition table are stored in the LUN. For example, as shown in FIG. 5, LUN partitioner 604 may store a signature 502 and a partition table 504 in LUN 500. Signature 502 is a digital and/or disk signature for LUN 500, and may include various information, including identifying information for LUN 500. Partition table 504 is a data structure that is configured to indicate the locations and sizes of partitions formed in LUN 500 by LUN partitioner 604.

In step 706, the LUN is partitioned into a plurality of partitions. In an embodiment, LUN partitioner 604 is configured to partition LUN 500 into plurality of partitions 506a-506p. LUN 500 may have any number of partitions 506 as needed by host computer 602, and as can be fit into the amount of storage of LUN 500. LUN partitioner 604 generates partitions 506, and indicates partitions 506 in partition table 504. For example, LUN partitioner 604 may indicate partitions 506a-506p in partition table 504 in the form of LBA offsets from a base LBA (e.g., LBA 0). For instance, partition table 504 may indicate an LBA range in LUN 500 for signature 502 (e.g., LBA 0 to LBA 600), an LBA range for partition table 504 (e.g., LBA 601 to LBA 10000), an LBA range for partition 506a (e.g., LBA 10001 to LBA 123456), an LBA range for partition 506b (e.g., LBA 123457 to LBA 654321), an LBA range for partition 506c (e.g., LBA 654322 to LBA 999999), etc.

In step 708, a plurality of datasets is stored in the plurality of partitions. For example, as shown in FIG. 5, host computer 602 may store one (or more) of datasets 508a-508p in each of partitions 506a-506p. As described above, a dataset 508 may be one or more files that form data and/or an application, such as a virtual machine (a virtual machine hard drive), etc. For example, similarly to host computer 102a shown in FIG. 4, host computer 602 may operate a plurality of virtual machines 402a-402p, each having a corresponding virtual hard drive stored as one of datasets 508a-508p shown in FIG. 5. Because multiple virtual hard drives can be stored in LUN 500 (as datasets 508), host computer 602 has fewer LUNs to manage for a same or even larger number of virtual machines, enabling host computer 602 to support larger numbers of virtual machines with a higher level of storage performance Furthermore, the ability to "pivot" datasets and/or partitions from a LUN that stores multiple datasets is enabled. For example, LUN 500 may store datasets 508a-508p in multiple partitions as a form of data store, and individual ones of datasets 508a-508p may be copied from LUN 500 to respective LUNs associated with further host computers. The further host computers can access the datasets at the respective LUNs. As such, the ownership of a dataset can be pivoted from a first host computer to a second host computer, which is provided access to the dataset in the form of a dedicated LUN. Furthermore, the second host computer can pivot ownership of the dataset back to the first host computer when the second host computer no longer needs access to the dataset, by copying the dataset from the dedicated LUN back to the multi-partition LUN.

The ability to store multiple datasets in a LUN, and to pivot access to the datasets to further LUNs, enables a virtual machine manager of a host computer to scale from managing a relatively low number of virtual machines to managing tens of thousands, hundreds of thousands, or even greater numbers of virtual machines. Furthermore, a storage array is enabled to park a LUN that is not currently being used back in the multi-partition LUN. Currently, commercially available storage arrays can store a fixed number of LUNs. For example, the EMC CLARiiON™ family series, produced by EMC Corporation of Hopkinton, Mass., can support only 4096 LUNs. According to embodiments described herein, which enable datasets to be parked until needed, a storage array can store 10 times more LUNs than conventionally possible. For example, 4096 LUNs may be exposed by the storage array at a particular time, but long term storage for 40,000 datasets is enabled.

It is noted that a standard file server may store many datasets on a network share that may be used to distribute the datasets. However, network attached file systems lack speed and functionality when compared to raw (e.g., block level) access to file systems, as described above. Many advanced functions are available to block level access systems that are not available on network attached file systems. For instance, a network attached file system may scatter a set of virtual hard drives across a set of drives such that the virtual hard drives are no longer sequential. In contrast, in a block level access system, a different virtual hard drive may be placed in each partition of a LUN. Because a start block and an end block for each partition is known, complete block level locality is achieved. As a result, a number of LUNs exposed to host computers is reduced, and sequential and locality of performance is attained.

Examples of pivoting datasets/partitions of a multi-partition LUN to further LUNs are described in the next section, and examples of pivoting datasets of LUNS to partitions of a multi-partition LUN are described in a subsequent section.

III. Example Embodiments for Pivoting Datasets/LUN Partitions to LUNs

Figure 8:
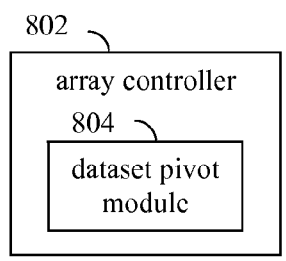
FIG. 8 shows a block diagram of a storage array controller, according to an example embodiment.
Figure 9:
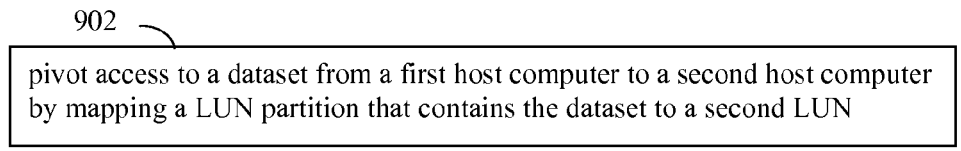
FIG. 9 shows a process for pivoting access to a dataset from a first host computer to a second host computer, according to an example embodiment.

In an embodiment, access to a dataset may be pivoted from a first host computer to a second host computer. For example, pivoting of a dataset may be performed to provide access to the dataset at the second host computer because the second host computer is less busy than the first host computer, or for other reason. Such pivoting may be performed in various ways, including configuring an array controller of a storage array to perform the pivoting. For instance, FIG. 8 shows a block diagram of an array controller 802, according to an example embodiment. Array controller 802 is similar to array controller 112 (FIGS. 1 and 2) described above, with differences described as follows. As shown in FIG. 8, array controller 802 includes a dataset pivot module 804. Dataset pivot module 804 enables array controller 802 to pivot access to a dataset. For example, dataset pivot module 804 may be configured to perform a step 902 shown in FIG. 9. In step 902, access to a dataset is pivoted from a first host computer to a second host computer by mapping a LUN partition that contains the dataset to a second LUN.

Figure 10:
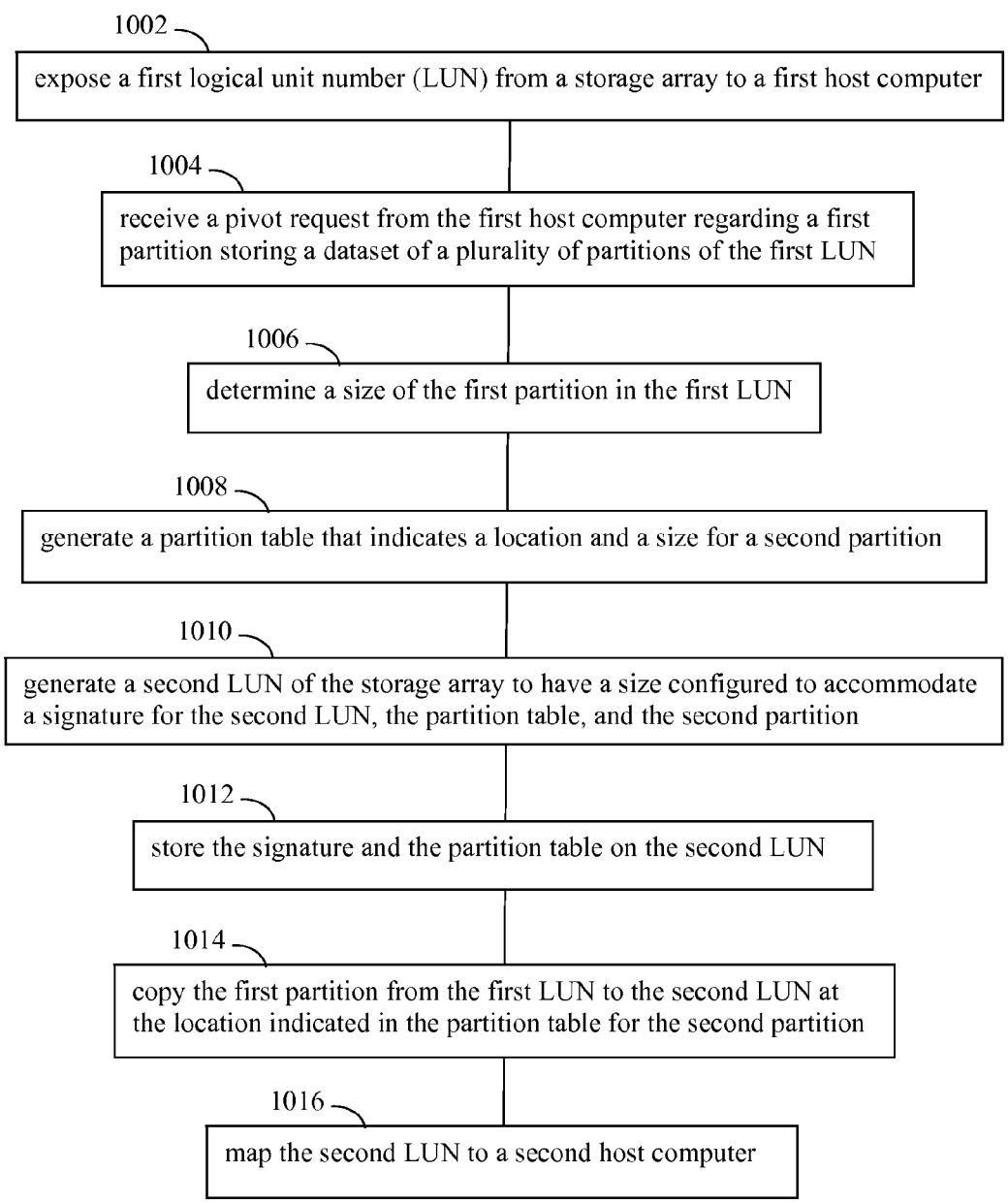
FIG. 10 shows a flowchart providing a process for pivoting a dataset from a first host computer to a second host computer, according to an example embodiment.
Figure 11:
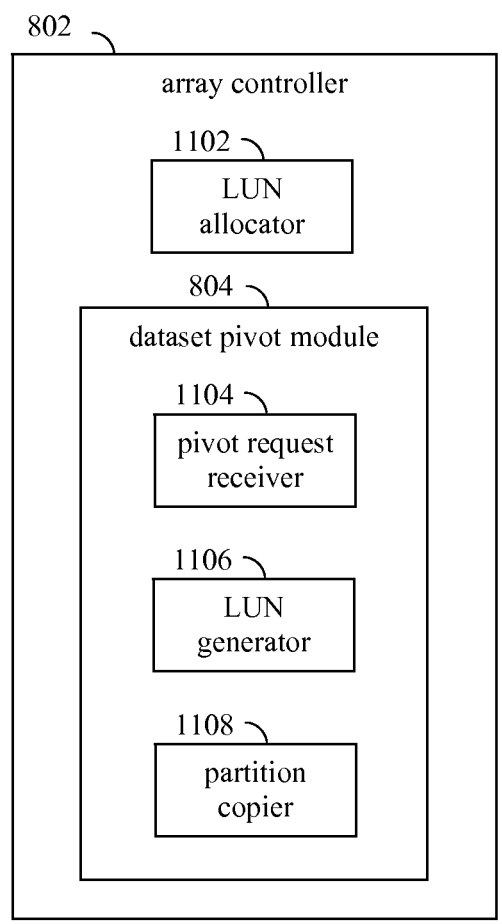
FIG. 11 shows a block diagram of an array controller, according to an example embodiment.

Array controller 802 may be configured in various ways to perform step 902, and step 902 may be performed in various ways. For instance, FIG. 10 shows a flowchart 1000 providing a process for pivoting a dataset from a first host computer to a second host computer according to an example embodiment. Flowchart 1000 is an example of step 902 shown in FIG. 9, and may be performed by array controller 802 shown in FIG. 8, in an embodiment. For instance, FIG. 11 shows a block diagram of array controller 802, according to an example embodiment. Flowchart 1000 is described with reference to the example of array controller 802 shown in FIG. 11, for purposes of illustration. As shown in FIG. 11, array controller 802 includes a LUN allocator 1102 and dataset pivot module 804. Dataset pivot module 804 includes a pivot request receiver 1104, a LUN generator 1106, and a partition copier 1108. Other structural and operational embodiments will be apparent to persons skilled in the relevant art(s) based on the discussion regarding flowchart 1000.

Figure 12:
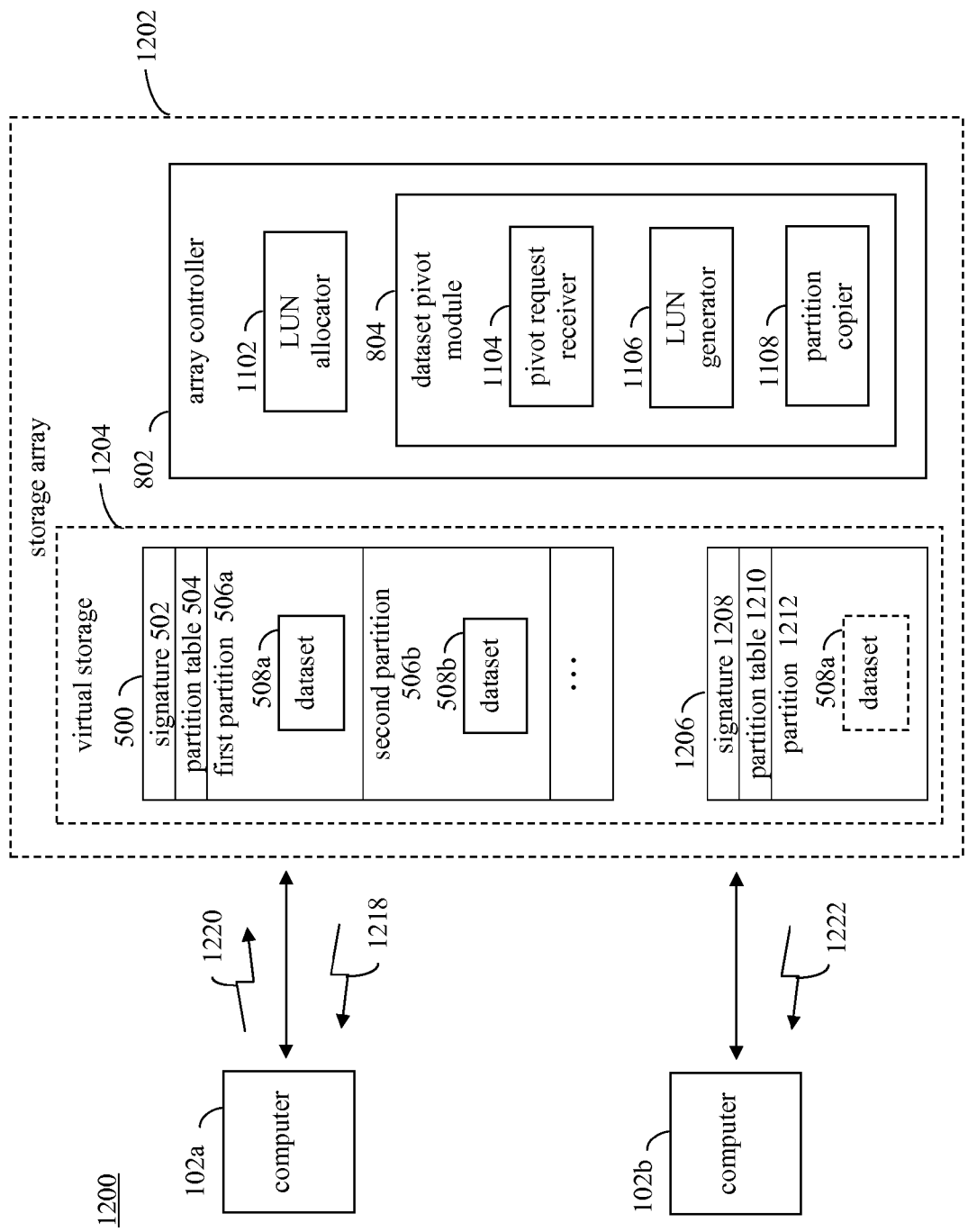
FIG. 12 shows a block diagram of a computing and data storage system, according to an example embodiment.

For illustrative purposes, flowchart 1000 is described as follows with respect to FIG. 12, which shows a block diagram of a computing and data storage system 1200, according to an example embodiment. As shown in FIG. 12, system 1200 includes first and second host computers 102a and 102b and a storage array 1202. Storage array 1202 includes virtual storage 1204 and array controller 802. Virtual storage 1204 includes first LUN 500 and a second LUN 1206 (additional LUNs may be present that are not shown in FIG. 12, for purposes of brevity). FIG. 12 illustrates a dataset 508a being pivoted from first host computer 102a to second host computer 102b.

As shown in FIG. 10, flowchart 1000 begins with step 1002. In step 1002, a first logical unit number (LUN) is exposed from a storage array to a first host computer. For example, in an embodiment, step 1002 may be performed by LUN allocator 1102. Referring to FIG. 12, LUN allocator 1102 may transmit an exposed LUN indicator signal 1218 to computer 102a (e.g., through a communication medium, such as shown in FIGS. 1 and 2), which indicates that first LUN 500 is allocated to computer 102a. For example, exposed LUN indicator signal 1218 may include an identifier (e.g., an identification number, an address, etc.) for first LUN 500 and an amount of storage included in first LUN 500.

After step 1002, first host computer 102a may access storage of first LUN 500, including storing data in, and retrieving data from LUN 500. For instance, first host computer 102a may perform flowchart 700 (FIG. 7) described above, including receiving the indication of LUN 500 (step 702), storing signature 502 and partition table 504 in LUN 500 (step 704), partitioning LUN 500 to create partitions 506a, 506b, etc. (step 706), and storing datasets 508a, 508b, etc., in partitions 506a, 506b, etc., respectively (step 708).

Figure 13:
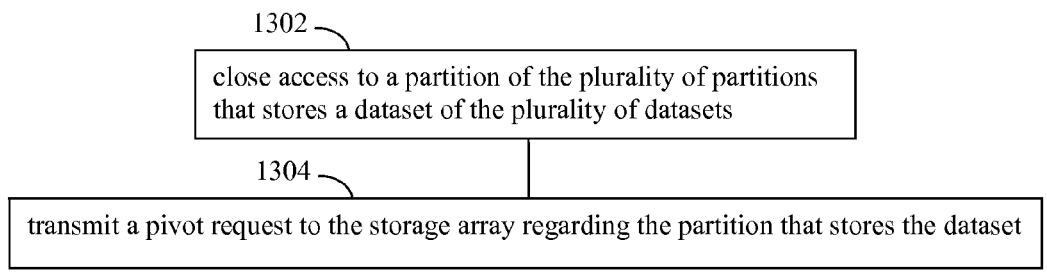
FIG. 13 shows a flowchart providing a process for enabling a partition to be pivoted, according to an example embodiment.

At a particular time, first host computer 102a may determine that a dataset of LUN 500 is to be pivoted to another host computer. For instance, it may be desired to pivot the dataset to a less busy host computer. As such, first host computer 102a may perform a flowchart 1300 shown in FIG. 13. Flowchart 1300 is described as follows. In step 1302 of flowchart 1300, access to a partition of the plurality of partitions that stores a dataset of the plurality of datasets is closed. For instance, first host computer 102a may close access to first partition 506a, which stores dataset 508a, to prepare dataset 508a to be pivoted. In an embodiment, first host computer 102a may close its open handles to dataset 508a, and once dataset 508a is no longer being accessed, a logical disk manager of first host computer 102a may remove a drive letter and mapping to first partition 506a. This ensures that first host computer 102a stops reading and/or writing to first partition 506a. In step 1304, a pivot request is transmitted to the storage array regarding the partition that stores the dataset. For example, as shown in FIG. 12, first host computer 102a may transmit a pivot request signal (e.g., through a communication medium, such as shown in FIGS. 1 and 2) to storage array 1202 to request that dataset 508a be pivoted to another host computer.

Referring back to flowchart 1000 (FIG. 10), in step 1004, a pivot request is received from the first host computer regarding a first partition storing a dataset of a plurality of partitions of the first LUN. For example, in an embodiment, step 1004 may be performed by pivot request receiver 1104. As shown in FIG. 12, pivot request receiver 1104 may receive pivot request signal 1220 from first host computer 102a, indicating that dataset 508a of first partition 506a is to be pivoted. As a result, pivot request receiver 1104 may indicate to LUN generator 1106 that a LUN be generated to accommodate dataset 508a.

In step 1006, a size of the first partition in the first LUN is determined. For example, in an embodiment, step 1006 may be performed by LUN generator 1106. LUN generator 1106 may determine the size of first partition 506a in any manner. For instance, referring to FIG. 12, LUN generator 1106 may access partition table 504 to determine an offset and/or range of LBAs allocated to first partition 506a. In another embodiment, first host computer 102a may include an indication of the size of first partition 506a in pivot request signal 1220 received by pivot request receiver 1104, and pivot request receiver 1104 may provide the size indication to LUN generator 1106.

In step 1008, a partition table is generated that indicates a location and a size for a second partition. For example, in an embodiment, step 1008 may be performed by LUN generator 1106. LUN generator 1106 may be configured to generate a partition table that indicates a second partition configured to store dataset 508a in a new LUN. The partition table is generated to indicate a location (e.g., a LBA offset) and a size (e.g., a start LBA and end LBA) for the second partition in the new LUN. In an embodiment, the partition table includes a reference to the second partition, but to no other partitions, and the indication of the second partition in the generated partition table immediately follows a signature generated for the new LUN.

In step 1010, a second LUN of the storage array is generated to have a size configured to accommodate a signature for the second LUN, the partition table, and the second partition. For example, in an embodiment, step 1010 may be performed by LUN generator 1106. LUN generator 1106 is configured to allocate an amount of physical storage of storage array 1202 to be included in a second LUN in virtual storage 1204. For example, as shown in FIG. 12, LUN generator 1106 may generate second LUN 1206. Second LUN 1206 is generated to have a size configured to accommodate a signature, the partition table generated in step 1008, and the second partition.

In step 1012, the signature and the partition table are stored on the second LUN. For example, in an embodiment, step 1012 may be performed by LUN generator 1106. For example, as shown in FIG. 12, LUN generator 1106 stored a signature 1208 and a partition table 1210 in second LUN 1206. Signature 1208 includes identifying information for second LUN 1206, and partition table 1210 was generated in step 1008.

In step 1014, the first partition is copied from the first LUN to the second LUN at the location indicated in the partition table for the second partition. For example, in an embodiment, step 1014 may be performed by partition copier 1108. Partition copier 1108 is configured to copy a partition from a source LUN to a destination LUN. To initiate the copying, LUN generator 1106 may indicate to partition copier 1108 that the destination LUN has been generated. For instance, referring to FIG. 12, partition copier 1108 copies first partition 506a (including dataset 508a) of first LUN 500 to second partition 1212 in second LUN 1206. As shown in FIG. 12, dataset 508a is copied to partition 1212 of second LUN 1206 (as indicated by dotted lines). Partition copier 1108 may perform the partition copying in any manner, including by techniques known to persons skilled in the relevant art(s). For example, partition copier 1108 may perform a snapshot (e.g., using copy-on-write snapshot technology) or a clone of first partition 506a to generate partition 1212. For instance, a copy command may be issued in the form "snapshot LUN 500: Partition 506a" or "LUN 500: LBA start-LBA end," where "LBA start" and "LBA end" are respective starting and ending LBAs for first partition 506a in first LUN 500. Such a copying operation may be performed relatively rapidly, such as in the order of seconds. In an embodiment, LUN 1206 is completely filled by signature 1208, partition table 1210 (which may follow signature 1208), and partition 1212 (which may follow partition table 1210), although in other embodiments, LUN 1206 may include additional storage space.

In step 1016, the second LUN is mapped to a second host computer. For example, in an embodiment, step 1016 may be performed by LUN allocator 1102. For instance, similarly to step 1002, LUN allocator 1102 may transmit an exposed LUN indicator signal (e.g., through a communication medium, such as shown in FIGS. 1 and 2) to second host computer 102b, which indicates that second LUN 1206 is allocated to second host computer 102b. For example, exposed LUN indicator signal 1222 may include an identifier (e.g., an identification number, an address, etc.) for second LUN 1206 and an amount of storage included in second LUN 1206. In an embodiment, second host computer 102b may issue a rescan command to detect second LUN 1206, and may be requested to import second LUN 1206 by exposed LUN indicator signal 1222.

Figure 14:
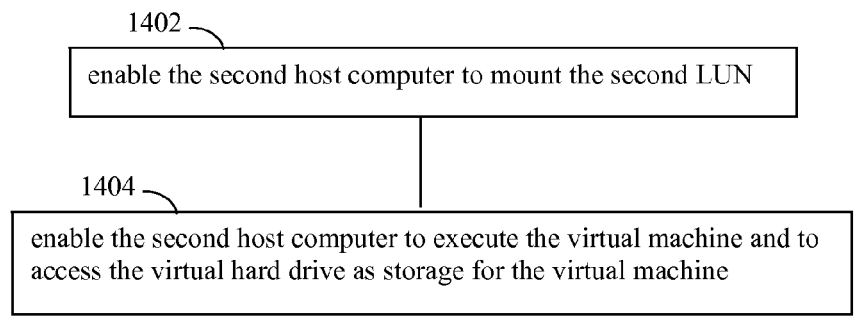
FIG. 14 shows a flowchart providing processes enabled at second host computer that receives access to a pivoted LUN, according to an example embodiment.

After importing second LUN 1206, second LUN 1206 is mountable and usable by second host computer 102b in a similar manner as a direct access device. For instance, in an embodiment, second host computer 102b may perform a flowchart 1400 shown in FIG. 14. Flowchart 1400 provides example processes enabled at second host computer 102b. In step 1402 of flowchart 1400, the second host computer is enabled to mount the second LUN. For instance, LUN allocator 1102 enables second host computer 102b to mount second LUN 1206. As such, second host computer 102b may access dataset 508a stored in partition 1212 of second LUN 1206. For example, if dataset 508a is a virtual machine hard drive, second host computer 102b may execute a virtual machine file of dataset 508a to operate the corresponding virtual machine. As such, in step 1404 of flowchart 1400, the second host computer is enabled to execute the virtual machine and to access the virtual hard drive as storage for the virtual machine.

IV. Example Embodiments for Pivoting LUNs to Datasets/ LUN Partitions

In an embodiment, access to a dataset may be pivoted from the second host computer back to the first host computer (or to another host computer). Such pivoting of the dataset may be performed because the second host computer has no need to further interact with the dataset, and thus the dataset is being retired (e.g., temporarily or finally), or for other reason. Such pivoting may be performed in various ways, including using an array controller of a storage array to perform the pivoting. For instance, array controller 802 shown in FIG. 8 may be configured to perform the pivoting in an embodiment. Dataset pivot module 804 may enable array controller 802 to pivot access to the dataset back to the first host computer (or another host computer). For example, dataset pivot module 804 may be configured to perform step 1502 shown in FIG. 15. In step 1502, access to the dataset is pivoted from the second host computer to the first host computer by mapping the LUN that contains the dataset to a LUN partition.

Dataset pivot module 804 may be configured in various ways to perform step 1502, and step 1502 may be performed in various ways. For instance, FIG. 16 shows a flowchart 1600 providing a process for pivoting a dataset from the second host computer to the first host computer (or another host computer) according to an example embodiment. Flowchart 1600 is an example of step 1502 shown in FIG. 15, and may be performed by array controller 802 shown in FIG. 11, in an embodiment. Other structural and operational embodiments will be apparent to persons skilled in the relevant art(s) based on the discussion regarding flowchart 1600.

Figure 17:
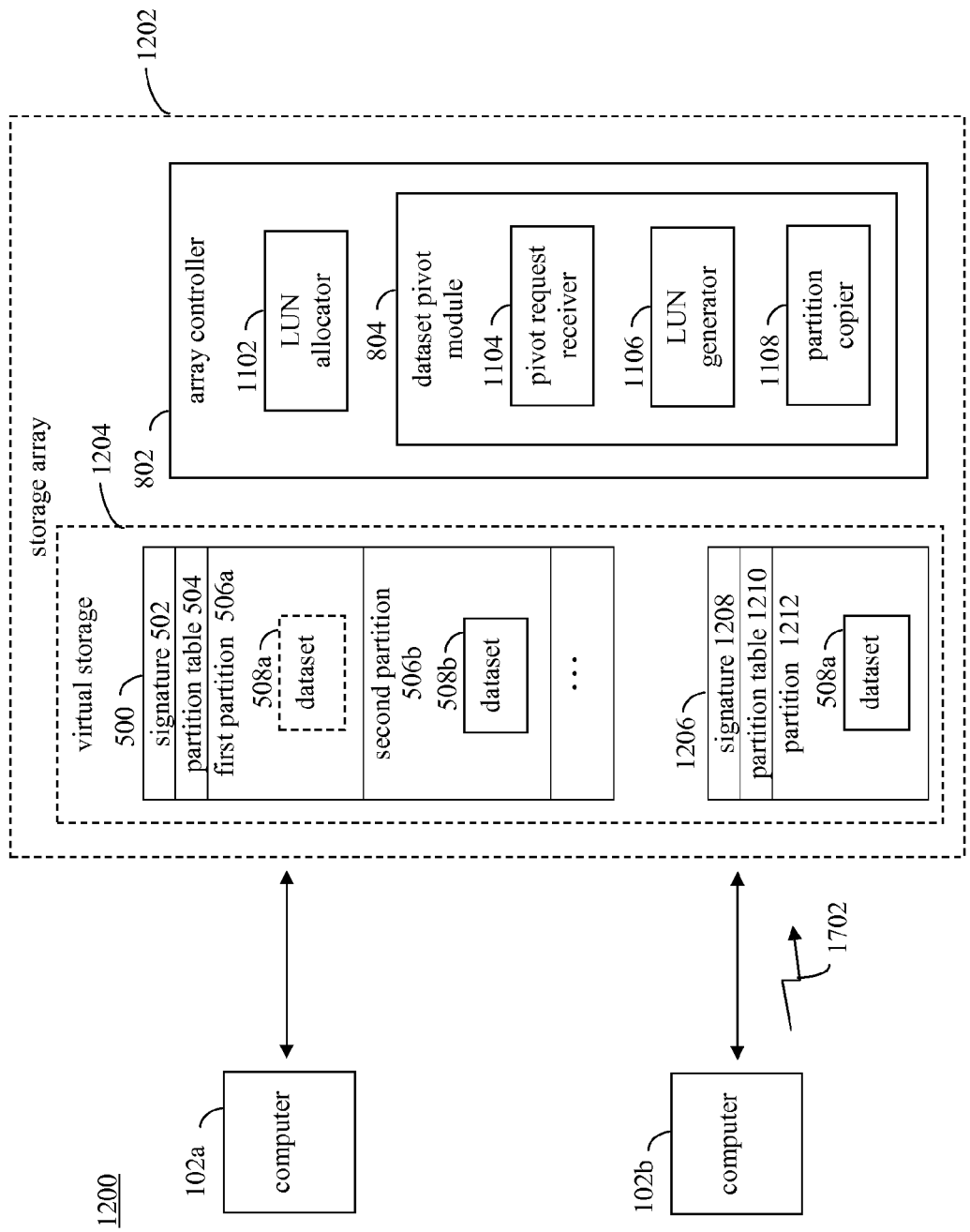
FIG. 17 shows a block diagram of the computing and data storage system of FIG. 12, according to an example embodiment.

For illustrative purposes, flowchart 1600 is described as follows with respect to FIG. 17, which shows a block diagram of computing and data storage system 1200 of FIG. 12, according to an example embodiment. FIG. 17 illustrates dataset 508*a* being pivoted from second host computer 102*b* to first host computer 102*a*.

As shown in FIG. 16, flowchart 1600 begins with step 1602. In step 1602, a first LUN of a storage array is exposed to a first host computer and a second LUN of the storage array is exposed to a second host computer. For example, referring to FIG. 17, first LUN 500 may be exposed to first host computer 102*a*, and second LUN 1206 may be exposed to second host computer 102*b*. In an embodiment, first LUN 500 may have been exposed to first host computer 102*a* according to step 1002 of flowchart 1000 (FIG. 10) and second LUN 1206 may have be exposed to second host computer 102*b* according to step 1016 of flowchart 1000, as described above.

Figure 18:
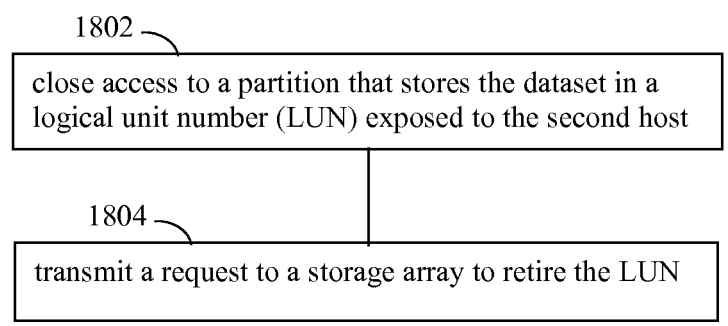
FIG. 18 shows a flowchart providing a process for enabling a partition to be pivoted, according to an example embodiment.

At a particular time, second host computer 102*b* may determine that dataset 508*a* is to be pivoted back to first host computer 102*a* (or to another host computer). As such, second host computer 102*b* may perform a flowchart 1800 shown in FIG. 18. Flowchart 1800 is described as follows. In step 1802 of flowchart 1800, access is closed to a partition that stores the dataset in a logical unit number (LUN) exposed to the second host. For instance, second host computer 102*b* may close access to partition 1212 of second LUN 1206, which stores dataset 508*a*, to prepare dataset 508*a* to be pivoted. In an embodiment, second host computer 102*b* may close any open handles to dataset 508*a*, and once dataset 508*a* is no longer being accessed, a logical disk manager of second host computer 102*b* may remove a drive letter and mapping to partition 1212. This ensures that second host computer 102*b* stops reading and/or writing to partition 1212. In step 1804, a request is transmitted to a storage array to retire the LUN. For example, as shown in FIG. 18, second host computer 102*b* may transmit a retire or pivot request signal 1702 to storage array 1202 (e.g., through a communication medium, such as shown in FIGS. 1 and 2) to request that dataset 508*a* be retired and/or pivoted to another host computer.

Referring back to flowchart 1600 (FIG. 16), in step 1604, a request is received from the second host computer to retire the second LUN. For example, in an embodiment, step 1604 may be performed by pivot request receiver 1104. As shown in FIG. 17, pivot request receiver 1104 may receive retire request signal 1702 from second host computer 102*b*. Retire request signal 1702 may indicate that dataset 508*a* stored in partition 1212 is to be pivoted back to a multi-partition LUN that operates as a storage library.

In step 1606, a size of the partition in the second LUN is determined For example, in an embodiment, step 1606 may be performed by LUN generator 1106. LUN generator 1106 may determine the size of the partition (e.g., partition 1212) in any manner. For instance, referring to FIG. 17, LUN generator 1106 may access partition table 1210 of LUN 1206 to determine an offset and/or range of LBAs allocated to partition 1212. In another embodiment, second host computer 102*b* may include an indication of the size of partition 1212 in retire request signal 1702 received by pivot request receiver 1104, and pivot request receiver 1104 may provide the size indication to LUN generator 1106.

In step 1608, a copy of the dataset is stored in the first LUN. For example, in an embodiment, step 1608 may be performed by partition copier 1108. As described above, partition copier 1108 may be configured to copy a partition from a source LUN to a destination LUN. For instance, referring to FIG. 17, partition copier 1108 may copy partition 1212 (including dataset 508*a*) of second LUN 1206 to first partition 506*a* in first LUN 500 if partition 1212 has a size (determined in step 1606) that does not exceed (e.g., is equal to or less than) a size of partition 506*a*, or may copy partition 1212 to another partition of first LUN 500. In an embodiment, if the size of partition 1212 in second LUN 1206 exceeds the size of first partition 506*a* in first LUN 500, a size of first LUN 500 may be increased (e.g., first LUN 500 may be caused to grow in size) by array controller 802 by appending a storage region of storage array 1202 to first LUN 500. In such case, the copy of dataset 508*a* may be stored in the storage region appended to first LUN 500. First host computer 102*a* may dismount and remount first LUN 500 to be enabled to access the appended storage region.

In the example of FIG. 17, dataset 508*a* is copied to first partition 506*a* of first LUN 500 (as indicated by dotted lines). Partition copier 1108 may perform the partition copying in any manner, as may be known to persons skilled in the relevant art(s), including the techniques described above with respect to step 1014 of flowchart 1000 (FIG. 10). Such a copying operation may be performed relatively rapidly, including being performed in the order of seconds.

In step 1610, a partition table of the first LUN is updated to include a partition corresponding to a storage region of the first LUN that stores the copy of the dataset. For instance, in an embodiment, step 1610 may be performed by LUN generator 1106. In the example of FIG. 17, LUN generator 1106 may be configured to update partition table 504 of first LUN 500 according to the copying of dataset 508*a* to first partition 506*a* or other partition of first LUN 500. If first LUN 500 is grown to create a new partition for storing dataset 508*a*, a location and/or size of the new partition is indicated in partition table 504 by LUN generator 1106. First host computer 102*a* may then un-mount and remount first LUN 500 to update the partition table in memory/cache of first host computer 102*a*, if needed.

The embodiments described herein enable datasets, such as virtual machine files, to be stored in a multi-partition LUN, and stored as one or more files in a dedicated LUN in real time, which can be exposed to a host computer. The multi-partition LUN may operate as a consolidated library of virtual hard drives. When a dataset is desired to be deployed, the dataset is converted into a LUN and allocated to the destination host. The partition of the multi-partition LUN containing a desired dataset can be relatively rapidly replicated (e.g., seconds per terabyte) to a dedicated LUN (e.g., using hardware copy on write snapshot technology). The dataset copied into the dedicated LUN may then be exposed to a new server and accessed as a directly attached LUN. This technique may be used to allow for rapid deployment of virtual machines, can be used to enable data mining on larger databases, and/or may be used to allow a storage array to scale to 10× or 100× its conventional LUN map limitations, enabling the storage array to be used as a long term repository. Such a storage array may be enabled to simulate a virtual tape library, as the autoloader commands could be remapped within the storage array to allow a partition to be repopulated back into a discrete LUN.

V. Further Example Embodiments

Array controller 112 (FIGS. 1, 2), LUN partitioner 604 (FIG. 6), array controller 802 (FIGS. 8, 11, 12, 17), dataset pivot module 804 (FIGS. 8, 11, 12, 17), LUN allocator 1102 (FIGS. 11, 12, 17), pivot request receiver 1104 (FIGS. 11, 12, 17), LUN generator 1106 (FIGS. 11, 12, 17), and partition copier 1108 (FIGS. 11, 12, 17) may be implemented in hardware, software, firmware, or any combination thereof. For example, array controller 112, LUN partitioner 604, array controller 802, dataset pivot module 804, LUN allocator 1102, pivot request receiver 1104, LUN generator 1106, and/or partition copier 1108 may be implemented as computer program code configured to be executed in one or more processors. Alternatively, array controller 112, LUN partitioner 604, array controller 802, dataset pivot module 804, LUN allocator 1102, pivot request receiver 1104, LUN generator 1106, and/or partition copier 1108 may be implemented as hardware logic/electrical circuitry.

Figure 19:
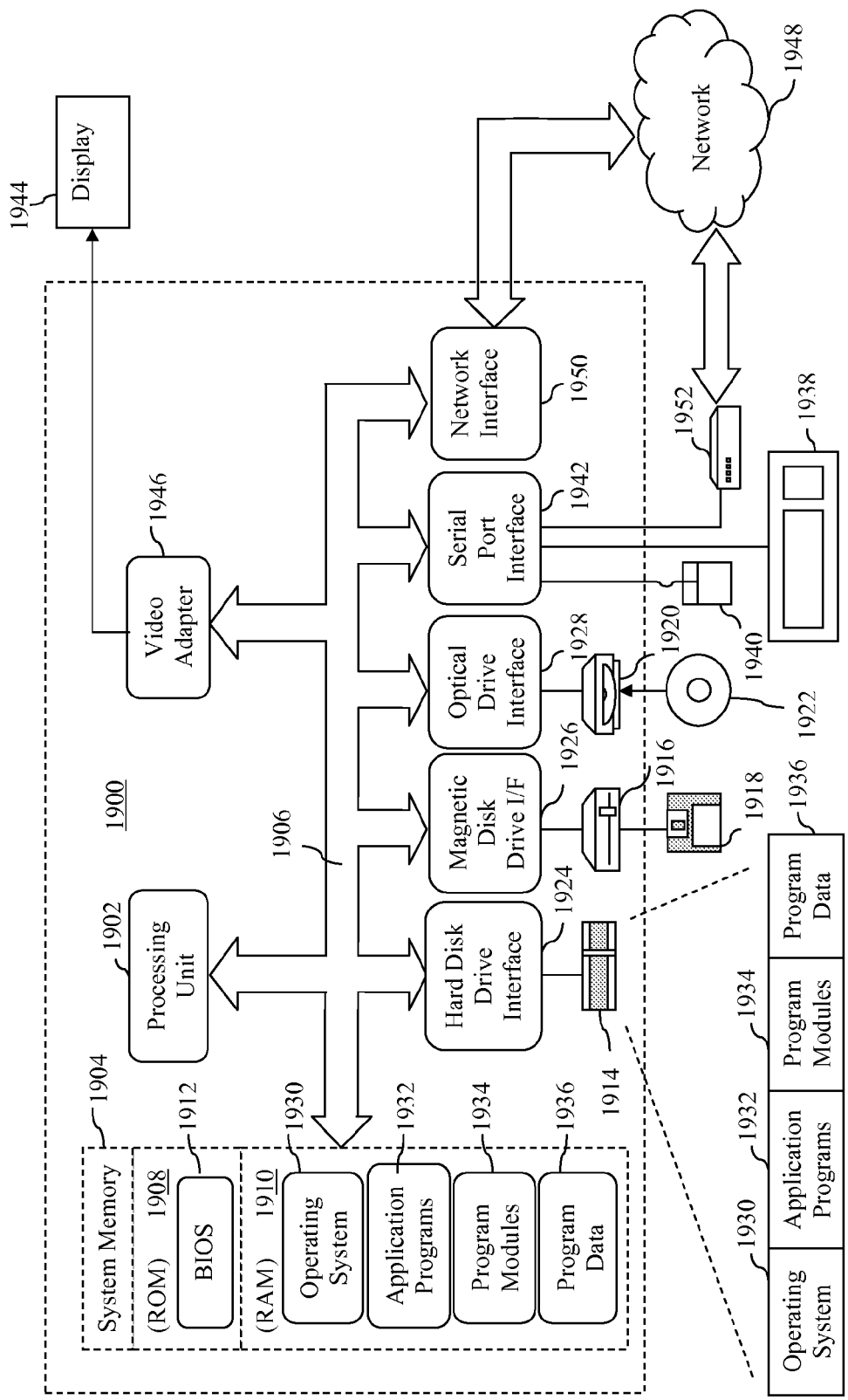
FIG. 19 shows a block diagram of an example computer that may be used to implement embodiments of the present invention.

FIG. 19 depicts an exemplary implementation of a computer 1900 in which embodiments of the present invention may be implemented. For instance, computers 102a-102c (FIGS. 1, 12, 17) and/or computer 602 (FIG. 6) may be implemented similarly to computer 1900, and may include one or more features of computer 1900 and/or alternative features. Computer 1900 may be a general-purpose computing device in the form of a conventional personal computer, a mobile computer, or a workstation, for example, or computer 1900 may be a special purpose computing device. The description of computer 1900 provided herein is provided for purposes of illustration, and is not intended to be limiting. Embodiments of the present invention may be implemented in further types of computer systems, as would be known to persons skilled in the relevant art(s).

As shown in FIG. 19, computer 1900 includes a processing unit 1902, a system memory 1904, and a bus 1906 that couples various system components including system memory 1904 to processing unit 1902. Bus 1906 represents one or more of any of several types of bus structures, including a memory bus or memory controller, a peripheral bus, an accelerated graphics port, and a processor or local bus using any of a variety of bus architectures. System memory 1904 includes read only memory (ROM) 1908 and random access memory (RAM) 1910. A basic input/output system 1912 (BIOS) is stored in ROM 1908.

Computer 1900 also has one or more of the following drives: a hard disk drive 1914 for reading from and writing to a hard disk, a magnetic disk drive 1916 for reading from or writing to a removable magnetic disk 1918, and an optical disk drive 1920 for reading from or writing to a removable optical disk 1922 such as a CD ROM, DVD ROM, or other optical media. Hard disk drive 1914, magnetic disk drive 1916, and optical disk drive 1920 are connected to bus 1906 by a hard disk drive interface 1924, a magnetic disk drive interface 1926, and an optical drive interface 1928, respectively. The drives and their associated computer-readable media provide nonvolatile storage of computer-readable instructions, data structures, program modules and other data for the computer. Although a hard disk, a removable magnetic disk and a removable optical disk are described, other types of computer-readable media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1930, one or more application programs 1932, other program modules 1934, and program data 1936. Application programs 1932 or program modules 1934 may include, for example, computer program logic for implementing/enabling array controller 112, LUN partitioner 604, array controller 802, dataset pivot module 804, LUN allocator 1102, pivot request receiver 1104, LUN generator 1106, and/or partition copier 1108, flowchart 700, step 902, flowchart 1000, flowchart 1300, flowchart 1400, step 1502, flowchart 1600, flowchart 1800, (including any step of flowcharts 700, 1000, 1300, 1400, 1600, and 1800), and/or any further embodiments as described above.

A user may enter commands and information into the computer 1900 through input devices such as keyboard 1938 and pointing device 1940. Other input devices (not shown) may include a microphone, joystick, game pad, satellite dish, scanner, or the like. These and other input devices are often connected to the processing unit 1902 through a serial port interface 1942 that is coupled to bus 1906, but may be connected by other interfaces, such as a parallel port, game port, or a universal serial bus (USB).

A monitor 1944 or other type of display device is also connected to bus 1906 via an interface, such as a video adapter 1946. In addition to the monitor, computer 1900 may include other peripheral output devices (not shown) such as speakers and printers.

Computer 1900 is connected to a network 1948 (e.g., the Internet) through a network adaptor or interface 1950, a modem 1952, or other means for establishing communications over the network. Modem 1952, which may be internal or external, is connected to bus 1906 via serial port interface 1942.

As used herein, the terms "computer program medium" and "computer-readable medium" are used to generally refer to media such as the hard disk associated with hard disk drive 1914, removable magnetic disk 1918, removable optical disk 1922, as well as other media such as flash memory cards, digital video disks, random access memories (RAMs), read only memories (ROM), and the like.

As noted above, computer programs and modules (including application programs 1932 and other program modules 1934) may be stored on the hard disk, magnetic disk, optical disk, ROM, or RAM. Such computer programs may also be received via network interface 1950 or serial port interface 1942. Such computer programs, when executed or loaded by an application, enable computer 1900 to implement features of embodiments of the present invention discussed herein. Accordingly, such computer programs represent controllers of the computer 1900.

The invention is also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMs, nanotechnology-based storage devices, and the like.

In another embodiment, a method in a storage array controller is provided. A first logical unit number (LUN) is exposed from a storage array to a first host computer. A pivot request is received from the first host computer regarding a first partition of a plurality of partitions of the first LUN. The first partition stores a dataset of a plurality of datasets stored in the plurality of partitions. A size of the first partition in the first LUN is determined A partition table is generated that indicates a location and a size for a second partition, the size of the second partition being greater than or equal to (≧) the determined first partition size. A second LUN of the storage array is generated to have a size configured to accommodate a signature for the second LUN, the partition table, and the second partition. The signature and the partition table are stored on the second LUN. The first partition is copied from the first LUN to the second LUN at the location indicated in the partition table for the second partition. The second LUN is mapped to a second host computer.

In an embodiment, the dataset is a virtual hard drive for a virtual machine.

In an embodiment, the mapping includes enabling the second host computer to mount the second LUN, and enabling the second host computer to execute the virtual machine and to access the virtual hard drive as storage for the virtual machine.

In an embodiment, determining a size of the first partition in the first LUN comprises determining a start logical block address (LBA) and an end LBA in the first LUN for the partition.

In an embodiment, the copying includes performing a copy-on-write snapshot or a clone of the first partition to copy the first partition from the first LUN to the second LUN.

In an embodiment, the method includes further steps. A request is received from the second host computer to retire the second LUN. A size of the second partition is determined. A copy of the second partition is stored in the first LUN. A partition table of the first LUN is updated to include a partition corresponding to a storage region of the first LUN in which the copy of the second partition is stored.

In an embodiment, the storing a copy of the second partition in the first LUN includes storing the copy of the second partition in the first partition of the first LUN if the determined size of the second partition does not exceed a size of the first partition in the first LUN.

In an embodiment, the storing a copy of the second partition in the first LUN further includes, if the determined size of the second partition exceeds the size of the first partition in the first LUN, growing a size of the first LUN by appending a storage region to the first LUN and storing the copy of the second partition in the appended storage region of the first LUN.

In another embodiment, a method in a first host computer is provided. An indication is received of a first logical unit number (LUN) exposed by a storage array to the first host computer. A signature and a partition table are stored in the first LUN. The first LUN is partitioned into a plurality of partitions. A plurality of datasets is stored in the plurality of partitions. Access to a partition of the plurality of partitions that stores a dataset of the plurality of datasets is closed. A pivot request is transmitted to the storage array regarding the partition that stores the dataset, the storage array being configured to copy the partition to a second LUN and map the second LUN to a second host computer in response to the pivot request.

In an embodiment, the dataset is a virtual hard drive for a virtual machine.

In an embodiment, the second host computer is enabled to mount the second LUN, to execute the virtual machine, and to access the virtual hard drive as storage for the virtual machine.

In an embodiment, the transmitting includes transmitting a start logical block address (LBA) and an end LBA in the first LUN for the partition to the storage array.

In another embodiment, a method in a storage array controller is provided. A first LUN of a storage array is exposed to a first host computer and a second LUN of the storage array to a second host computer, the first LUN including a plurality of partitions and the second LUN including a partition that stores a dataset. A request is received from the second host computer to retire the second LUN. A size of the partition in the second LUN is determined A copy of the dataset is stored in the first LUN. A partition table of the first LUN is updated to include a partition corresponding to a storage region of the first LUN that stores the copy of the dataset.

In an embodiment, the storing a copy of the dataset in a partition of the first LUN includes storing the copy of the dataset in a first storage region of the first LUN that previously stored the dataset if the determined size of the partition in the second LUN does not exceed a size of the first storage region in the first LUN.

In an embodiment, the storing a copy of the dataset in a partition of the first LUN further comprises, if the determined size of the partition in the second LUN exceeds the size of the first storage region in the first LUN, growing a size of the first LUN by appending a second storage region to the first LUN and storing the copy of the dataset in the second storage region of the first LUN.

In an embodiment, the dataset is a virtual hard drive for a virtual machine.

In an embodiment, the determining a size of the partition in the second LUN includes determining a start logical block address (LBA) and an end LBA in the second LUN for the partition.

In an embodiment, the storing a copy of the dataset in the first LUN includes performing a copy-on-write snapshot or a clone of the partition in the second LUN to copy the partition from the second LUN to the first LUN.

IV. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method in a first host computer, comprising:
 receiving an indication of a first logical unit number (LUN) associated with a storage array that is exposed to the first host computer as virtual storage, the indication including a LUN identifier and indicating an amount of storage of the first LUN;
 storing a signature and a partition table in the first LUN;
 partitioning the first LUN into a plurality of partitions; and
 storing a plurality of datasets in the plurality of partitions.

2. The method of claim 1, further comprising:
 closing access to a partition of the plurality of partitions that stores a dataset of the plurality of datasets; and
 transmitting a pivot request to the storage array regarding the partition that stores the dataset, the storage array being configured to copy the partition to a second LUN and map the second LUN to a second host computer in response to the pivot request.

3. The method of claim 2, further comprising:
 pivoting the dataset back to the first host computer by receiving a copy of the dataset from the second LUN in a partition of the plurality of partitions.

4. The method of claim 2, wherein the dataset is a virtual hard drive for a virtual machine.

5. The method of claim 4, wherein the second host computer is enabled to mount the second LUN, to execute the virtual machine, and to access the virtual hard drive as storage for the virtual machine.

6. The method of claim 2, wherein said transmitting comprises:
transmitting a start logical block address (LBA) and an end LBA in the first LUN for the partition to the storage array.

7. The method of claim 1, wherein said storing a signature and a partition table in the first LUN comprises:
storing identifying information for the first LUN as the signature; and
storing indications of the locations and sizes of the plurality of partitions in the partition table.

8. A first host computer, comprising:
a LUN (logical unit number) partitioner that receives an indication of a first logical unit number (LUN) associated with a storage array that is exposed to the first host computer as virtual storage, the indication including a LUN identifier and indicating an amount of storage of the first LUN, the LUN partitioner configured to store a signature and a partition table in the first LUN, and to partition the first LUN into a plurality of partitions; and
at least one processor that stores a plurality of datasets in the plurality of partitions.

9. The first host computer of claim 8, wherein the first host computer closes access to a partition of the plurality of partitions that stores a dataset of the plurality of datasets, the first host computer further comprising:
a logical disk manager that removes a drive letter and mapping to the partition; and
the first host computer transmits a pivot request to the storage array regarding the partition that stores the dataset, the storage array being configured to copy the partition to a second LUN and map the second LUN to a second host computer in response to the pivot request.

10. The first host computer of claim 9, wherein the dataset is a virtual hard drive for a virtual machine.

11. The first host computer of claim 10, wherein the second host computer is enabled to mount the second LUN, to execute the virtual machine, and to access the virtual hard drive as storage for the virtual machine.

12. The first host computer of claim 9, wherein the first host computer receives an indication that the dataset has been pivoted back to the first host computer and remounts the first LUN.

13. The first host computer of claim 9, wherein the first host computer transmits a start logical block address (LBA) and an end LBA in the first LUN for the partition to the storage array.

14. The first host computer of claim 8, wherein the LUN partitioner stores identifying information for the first LUN as the signature and stores indications of the locations and sizes of the plurality of partitions in the partition table.

15. A computer readable storage medium having computer program logic embodied in said computer readable storage medium, the computer program logic comprising:
first computer program logic that enables the processor to receive an indication of a first logical unit number (LUN) associated with a storage array that is exposed to the first host computer as virtual storage, the indication including a LUN identifier and indicating an amount of storage of the first LUN;
second computer program logic that enables the processor to store a signature and a partition table in the first LUN;
third computer program logic that enables the processor to partition the first LUN into a plurality of partitions; and
fourth computer program logic that enables the processor to store a plurality of datasets in the plurality of partitions.

16. The computer readable storage medium of claim 15, further comprising:
fifth computer program logic that enables the processor to close access to a partition of the plurality of partitions that stores a dataset of the plurality of datasets; and
sixth computer program logic that enables the processor to transmit a pivot request to the storage array regarding the partition that stores the dataset, the storage array being configured to copy the partition to a second LUN and map the second LUN to a second host computer in response to the pivot request.

17. The computer readable storage medium of claim 16, wherein the dataset is a virtual hard drive for a virtual machine.

18. The computer readable storage medium of claim 17, wherein the second host computer is enabled to mount the second LUN, to execute the virtual machine, and to access the virtual hard drive as storage for the virtual machine.

19. The computer readable storage medium of claim 16, wherein the sixth computer program logic comprises:
computer program logic that enables the processor to transmit a start logical block address (LBA) and an end LBA in the first LUN for the partition to the storage array.

20. The computer readable storage medium of claim 15, wherein the second computer program logic comprises:
computer program logic that enables the processor to store identifying information for the first LUN as the signature; and
computer program logic that enables the processor to store indications of the locations and sizes of the plurality of partitions in the partition table.

* * * * *